United States Patent [19]

Johansen, Jr. et al.

[11] Patent Number: 5,849,218
[45] Date of Patent: Dec. 15, 1998

[54] FLUORESCENT POOL COATING

[75] Inventors: Charles J. Johansen, Jr., Katy; Ernest D. Hollas, Weimar, both of Tex.

[73] Assignee: C-Cure Corporation, Katy, Tex.

[21] Appl. No.: 891,432

[22] Filed: Jul. 14, 1997

[51] Int. Cl.⁶ ............................ C09K 11/02; C04B 14/00
[52] U.S. Cl. .............................. 252/301.4 R; 252/301.16; 252/301.65; 106/712; 249/DIG. 3
[58] Field of Search ................. 106/712; 252/301.36, 252/301.65, 301.4 R, 301.16; 249/DIG. 3

[56] References Cited

U.S. PATENT DOCUMENTS

| | | | |
|---|---|---|---|
| 3,745,727 | 7/1973 | Chichester, Sr. | 52/169 |
| 4,172,063 | 10/1979 | O'Brill | 260/29.6 S |
| 5,271,754 | 12/1993 | Bauerecker et al. | 65/18.1 |
| 5,314,536 | 5/1994 | Kawasaki | 106/712 |
| 5,362,322 | 11/1994 | Johansen, Jr. et al. | 106/802 |
| 5,374,377 | 12/1994 | Nguyen et al. | 252/301.36 |
| 5,558,708 | 9/1996 | Johansen, Jr. et al. | 106/712 |
| 5,562,896 | 10/1996 | Repper et al. | 424/59 |

FOREIGN PATENT DOCUMENTS

| | | | |
|---|---|---|---|
| 2209371 | 6/1974 | France | 106/712 |

OTHER PUBLICATIONS

Chemical Abstract citation 82:63630: Fr 2209371, Jun. 28, 1974.

Georgia Marble Company, "Pool Mix Screen Analysis", Apr. 24, 1997.

*Primary Examiner*—Melissa Bonner
*Attorney, Agent, or Firm*—Hedman, Gibson & Costigan, P.C.

[57] ABSTRACT

Relates to an outer or top coating for water retention structures that comprises a water insoluble fluorescent compound that is invisible to the human eye under normal lighting conditions but which will fluoresce or glow and be visible to the human eye when illuminated with an ultraviolet or infrared radiation source.

7 Claims, No Drawings

FLUORESCENT POOL COATING

FIELD OF THE INVENTION

This invention relates to a fluorescent pool coating and a method of preparing the coating. More specifically, the invention relates to the incorporation of an insoluble fluorescent compound into the top coating or liner of a water retention structure such as a swimming pool, water fountain, fish pond or wishing well which will fluoresce, iridesce or glow when the top coat is illuminated with an ultraviolet or infrared light source commonly referred to as a black light.

BACKGROUND OF THE INVENTION

Water retention structures are generally constructed of a strong rigid material such as concrete, metal or polymeric resins. An outer or top coating is applied to these rigid structures for aesthetic purposes and often to assist in the retention of water within the confines of the structural elements. The coating can be formulated from a Portland cement based composition, a synthetic, vinyl or rubber liner or from a rubber based paint that is applied to the structural material.

U.S. Pat. No. 3,745,727 discloses a method for forming swimming pools wherein the rigid structural panels are coated with a high gloss non-porous resin that can include pigments and/or metal flakes.

It is also known that trace amounts of a fluorescent or iridescent material which are invisible to the human eye under conventional light sources but which fluoresce or glow under ultraviolet or infrared light can be incorporated into mortars and grouts as a product identification means. When a fluorescent or iridescent material is incorporated into a mortar or grout as an identification means the amount is very low, typically about 0.00010% to 0.00016% based on the weight of the cement.

However, the use of water insoluble compounds which fluoresce or glow in response to ultraviolet or infrared radiation with an outer or top coating of a water retention structure to produce an aesthetic effect has never occurred.

SUMMARY OF THE INVENTION

It is an object of the present invention to incorporate a water insoluble compound that fluoresces or glows when illuminated with an ultraviolet or infrared radiation source into the outer or top coating of a water retention structure to produce an aesthetic effect.

It is a further object of the present invention to incorporate a water insoluble compound into the outer or top coating of a water retention structure which is unnoticeable to the human eye during the day or when subjected to traditional incandescent or fluorescent light sources but is visible to the human eye when subjected to ultraviolet or infrared illumination.

The outer or top coating can be a Portland cement based composition, a synthetic, vinyl or plastic liner, a non-porous material such as a rubber based paint or a resin as described in U.S. Pat. No. 3,745,727.

In a preferred embodiment, the water insoluble fluorescent compound that is incorporated into the waterproofing layer is a zinc sulfide doped with copper, cobalt and/or manganese such as the type commercially available from USR Optonix Inc. of Hackettstown, N.J. 07840 under the tradename A11 pigment.

In an especially preferred embodiment the water insoluble fluorescent compound is mixed with a Portland cement composition. The water insoluble fluorescent compound and Portland cement composition mixture are then applied by a trowel or spray coating to the outer or top surface of a swimming pool, water fountain, fish pond or wishing well to a thickness of about 1/8" to about 1". The finished swimming pool, water fountain, fish pond or wishing well appears to be a solid color in sunlight or under an incandescent light source, but at night it would have a bright iridescence effect when ultraviolet or infrared radiation is used to illuminate the water retention structure. The iridescence effect can vary from isolated specs to a more concentrated and uniform appearance depending upon the amount of water insoluble fluorescent compound used.

Research has indicated that adding approximately 0.0002% to about 0.7%, preferably about 0.0005% to about 0.5%, of a water insoluble fluorescent compound based on the weight of the cement in the waterproofing layer will result in a waterproofing layer with isolated specs when illuminated with ultraviolet or infrared radiation. Further research has also indicated that adding greater than 0.7% to about 10%, preferably about 0.75% to about 7.5%, of a water insoluble fluorescent compound based on the weight of the cement of the waterproofing layer will result in a waterproofing layer with a substantially uniform or solid glow when illuminated with ultraviolet or infrared radiation.

DETAILED DESCRIPTION OF THE INVENTION

The present invention will be described by reference to outer or top coatings prepared from Portland cement based compositions. This description should not be construed as limiting the invention. Many variations which do not depart from the spirit or scope of the present invention will suggest themselves to those skilled in the art. All such obvious modifications are within the intended scope of the invention.

Accordingly, a Portland cement based pool plaster composition is provided by preparing a composition comprised of cement, inert filler, water insoluble fluorescent compound and water. In a preferred embodiment cement comprises from about 25% to about 45% of the total weight of solids in the plaster, the inert filler comprise from about 50% to about 70% of the total weight of solids in the plaster and the water insoluble fluorescent compound comprises from about 0.0001% to about 3.5% of the total weight of the solids in the plaster. The water for the plaster can vary from about 7 to about 15 gallons.

In a most preferred embodiment, the Portland cement comprises from about 35% to about 38% of the total weight of the solids in the plaster, the inert filler comprises from about 55% to about 62% of the total weight of the solids in the plaster and the water insoluble fluorescent compound comprises from about 0.0002% to about 0.025% of the total weight of the plaster solids to create an isolated spec appearance and greater than 0.025% to about 3.0% of the total weight of the plaster solids to create a solid appearance. The preferred amount of water used to create the plaster is about 8–12 gallons.

Conventional Portland cement will be referred to hereinafter as an illustrative example to simplify the description of the invention. It should be realized however, that the principles of this invention are applicable to all hydraulic cements such as, for example, calcium aluminate cements, blast furnace slag cement, and the like. Specific examples of the various cements can be found in applicants' copending U.S. patent application Ser. No. 08/462,942 which was filed on Jun. 5, 1995 and is incorporated herein by reference.

The inert filler aggregate may be silica sand, crushed limestone, perlite, volcanic aggregate, clay or other clean inert material. The inert filler aggregate component of the composition may comprise one, or a combination of clean inert materials. The ultimate criteria of the component being that such component be graded with not more than about 10 percent passing a number 140 sieve and none retained on a number 6 sieve, as well as having an AFS Grain Fineness Number (American Foundry Society) of not less than 100 but greater than 30.

The finer filler material on the other hand should have an average particle size which is less than 400 mesh, and may include pigments, inert materials such as limestone, alumina trihydrate, ground quartz, volcanic ash, certain fine sands, talc, mica, clays, and the like.

The water insoluble fluorescent compound used in the present invention is a compound such as a pigment or dye that can be incorporated into the waterproofing layer and will be invisible to the human eye under normal lighting conditions such as sunlight or iridescent light but will fluoresce or glow and be visible to the human eye when illuminated with an ultraviolet or infrared radiation source commonly known as a black light.

Preferred water insoluble fluorescent compounds that can be used in the present invention are commercially available from USR Optonix Inc. of Hackettstown, N.J.

The water insoluble fluorescent compound can be added to the outer or top coating material at any time prior to the application of the top coating material to the swimming pool or water fountain. It is important that the water insoluble fluorescent compound be well mixed or dispersed throughout the to coating material. When the top coating material is a Portland cement based composition, the water insoluble compound can be added to the dry cement composition and then mixed or to the wet cement composition and then mixed.

In an alternative embodiment, the water insoluble fluorescent compound can be incorporated into an aqueous pigment composition which is in turn added to a dry cement composition as described in applicants' copending U.S. Pat. No. 5,558,708 which was filed on Apr. 1, 1996 and is incorporated herein by reference.

Coloring materials which may also be incorporated into the present invention such as titanium dioxide, iron oxides, chromium oxides, zinc oxides, carbon black and alumina powder. Especially preferred coloring materials are blue pigments such as ultra marine blue, thalo blue, and cobalt blue all commercially available from Bayer Corporation-Industrial Chemicals Division.

The present invention may also include other conventionally known additives such as liquefiers, reinforcing fibers, coalescence additives, thixotropy control agents, preservatives, antifoaming agents, freeze thaw stabilizers, setting accelerators, polymers and the like. Representative examples of these conventional additives are described in applicants' copending U.S. patent application Ser. No. 08/462,942 which was filed on Jun. 5, 1995 and is incorporated herein by reference.

The following detailed examples are provided for illustrative purposes and may include particular features of the invention. However, the examples should not be construed as limiting the invention, many variations of which are possible without departing from the spirit or scope thereof. Unless otherwise indicated, the percentages or parts given are by weight.

EXAMPLE 1

A pool plaster composition in accordance with the present invention is prepared by mixing a cement based powder and water.

The cement based powder is prepared comprising the following ingredients:

|  | Lbs. |
| --- | --- |
| Portland Cement | 188 |
| Clay | 3 |
| Calcium Carbonate | 300 |
| Fluorescent Compound | 0.001 |

The calcium carbonate is commercially available from Georgia Marble Company of Kennesaw, Ga. under the tradename Pool Mix and has an average particle size wherein approximately 80% is retained on a 200 mesh screen. Similar calcium carbonate products are available from National Mineral Products and J. M. Huber Corp. The clay is a bentonite clay commercially available from Bentonite Corp. of Denver, Colo. under the tradename National® Standard Western Bentonite and the fluorescent compound is a fluorescent white pigment, Number 2200, commercially available from USR Optonix, Inc.

The foregoing components are added to about eight gallons of water in a horizontal ribbon mixer, paddle mixer or any type of commercially available job-site concrete mixer until a uniform consistency is obtained. The order in which the components are added to the mixer is not critical, however, experience has shown that placing the water in the mixer first and then adding the powder components to the water produces a more uniform product.

The resulting top coat will exhibit an isolated spec appearance when subjected to a black light.

EXAMPLE 2

A pool plaster composition in accordance with the present invention is prepared according to the procedure described in Example 1 except that 0.1 lbs of the fluorescent compound is added to the powder. The resulting top coat will exhibit an isolated spec appearance when subject to a black light.

EXAMPLE 3

A pool plaster composition in accordance with the present invention is prepared according to the procedure described in Example 1 except that 1.0 lbs of the fluorescent compound is added to the powder. The resulting plaster will exhibit a solid appearance when subject to a black light.

EXAMPLE 4

A pool plaster composition in accordance with the present invention is prepared according to the procedure described in Example 1 except that 15 lbs of the fluorescent compound is added to the powder. The resulting plaster will exhibit a solid appearance when subject to a black light.

EXAMPLE 5

A pool plaster composition in accordance with the present invention is prepared by mixing a cement based powder and water.

The cement based powder component of the pool plaster is prepared comprising the following ingredients:

|  | Lbs. |
| --- | --- |
| Portland Cement | 188 |
| Lime | 25 |
| Calcium Carbonate | 300 |
| Fluorescent Compound | 0.005 |

The calcium carbonate is commercially available from Georgia Marble Company of Kennesaw, Ga. under the tradename Pool Mix and has an average particle size wherein approximately 80% is retained on a 200 mesh screen. The lime is a mason type lime commercially available from APG Lime Corp. of New Braunfels, Tex. and the fluorescent compound is a fluorescent green pigment, Number 2210, commercially available from USR Optonix, Inc.

The foregoing components are blended as described in Example 1 and produces a plaster that exhibits an isolated spec appearance when subject to a black light.

EXAMPLE 6

A pool plaster composition in accordance with the present invention is prepared according to the procedure described in Example 5 except that 3 lbs of fluorescent compound is added to the powder. The resulting plaster will exhibit a solid appearance when subject to a black light.

EXAMPLE 7

A pool plaster in accordance with the present invention is prepared by mixing a powder component and a liquid admix.

The powder component of pool plaster is prepared according to the procedure outlined in Example 1 and comprises the following ingredients:

|  | Lbs. |
| --- | --- |
| Portland Cement | 188 |
| Lime | 25 |
| Calcium Carbonate | 300 |

The liquid admix component is prepared by first preparing a pigment base. The pigment base is prepared by adding 39 lbs of water; 70 lbs of cobalt blue pigment commercially available from Bayer Corp., Industrial Chemical Division; and 0.5 lbs of a white fluorescent compound, No. 2200, commercially available from USR Optonix Inc., to a mixer and mixing for a few minutes until a uniform consistency is obtained.

The pigment base is than added to an aqueous carrier composition comprising 422.6 lbs of water; 8.0 lbs of a synthetic hectorite clay commercially available from Southern Clay Products Inc. under the tradename Laponite®; 0.826 lbs of a chelating agent commercially available under the tradename Versene 100; 24.0 lbs of a suspending agent commercially available under the tradename Optibent CP; 33.0 lbs of Rovene® 4040 Latex commercially available from Ameripol Synpol Corporation; 0.25 lbs of Troysan 174, a preservative commercially available from Troy Chemical Co.; 0.5 lbs of Dow Corning Silicon Antifoam B; and 2.4 lbs of sodium chloride which is approximately 77% flake, commercially available from Dow Chemical Co. under the tradename DOWFLAKE. The resulting composition is mixed until a lump free mixture is obtained.

2.5 gallons of the liquid admix is slowly added to about 12–17 gallons of water in a mixer as described in Example 1. The powder component is then added to the mixer as described in Example 1 to consistently produce a blue pool plaster which exhibits an isolated spec appearance when subjected to a black light.

EXAMPLE 8

A pool plaster in accordance with the present invention is prepared according to the procedure outlined in Example 7 except that the powder component has the following composition:

|  | Lbs. |
| --- | --- |
| Portland Cement | 188 |
| Clay* | 5 |
| Calcium Carbonate* | 300 |

*The clay and calcium carbonate are as described in Example 1.

and the liquid admix comprises 3 lbs of fluorescent compound.

The liquid admix and powder component are mixed together as described in Example 7 to consistently produce a blue pool plaster which exhibits an solid appearance when subjected to a black light.

In an alternative embodiment, the liquid admix of Examples 7 and 8 could be premixed with water and packaged so that no additional water or ingredients other than the liquid admix and powder components are need to produce a pool plaster in accordance with the present invention.

All the above mentioned patents, publications and test methods are herein incorporated by reference.

We claim:

1. A top coating composition for a water retention structure comprising a hydraulic cement, an aggregate filler and a water insoluble fluorescent compound that is invisible to the human eye under normal lighting conditions but which will fluoresce or glow and be visible to the human eye when illuminated with an ultraviolet or infrared radiation source, the fluorescent compound being present in an amount of from about 0.0002 to about 0.7 weight percent of the cement, wherein the coating exhibits isolated specs when illuminated with ultraviolet or infrared radiation.

2. A top coating composition as described in claim 1 wherein the fluorescent compound is from about 0.0005 to about 0.5 weight percent of the cement.

3. A top coating composition as described in claim 1 further comprising a conventionally known additive taken from the group consisting of a liquefier, reinforcing fibers, a coalescence additive, a thixotropy control agent, a preservative, an antifoaming agent, a freeze thaw stabilizer, a setting accelerator, polymers, a color additive and mixtures thereof.

4. A top coating composition as described in claim 1 wherein the water insoluble fluorescent compound is a zinc sulfide doped with copper, cobalt, manganese or a combination of the foregoing.

5. A top coating composition for a water retention structure consisting essentially of a hydraulic cement, an aggregate filler and a water insoluble fluorescent compound that is invisible to the human eye under normal lighting conditions but which will fluoresce or glow and be visible to the human eye when illuminated with an ultraviolet or infrared radiation source wherein said fluorescent compound is from about 0.0002 to about 0.7 weight percent of the cement.

6. A top coating composition for a water retention structure consisting essentially of a hydraulic cement, an aggregate filler, a water insoluble fluorescent compound that is invisible to the human eye under normal lighting conditions but which will fluoresce or glow and be visible to the human eye when illuminated with an ultraviolet or infrared radiation source, wherein said fluorescent compound is from about 0.0002 to about 0.7 weight percent of the cement, and a conventionally known additive taken from the group consisting of a liquefier, reinforcing fibers, a coalescence additive, a thixotropy control agent, a preservative, an antifoaming agent, a freeze thaw stabilizer, a setting accelerator, polymers, a coloring material and mixtures thereof.

7. A top coating composition as described in claim 5 wherein the water insoluble fluorescent compound is a zinc sulfide doped with copper, cobalt, manganese or a combination of the foregoing.

* * * * *